United States Patent [19]

Takeuchi et al.

[11] 4,121,224

[45] Oct. 17, 1978

[54] RECORDING MECHANISM USING BALL-POINT-PEN

[76] Inventors: Jikko Takeuchi, 6-434, Honcho 4-chome, Koganei-City, Tokyo; Masaya Mizuno, 476-74, Hodokubo, Hino-City, Tokyo, both of Japan

[21] Appl. No.: 767,040

[22] Filed: Feb. 9, 1977

[51] Int. Cl.² .............................................. G01D 15/16
[52] U.S. Cl. ............................ 346/139 C; 346/140 R; 358/303
[58] Field of Search ................... 346/141, 140, 139 C, 346/105, 106; 358/303

[56] References Cited

U.S. PATENT DOCUMENTS

| | | | |
|---|---|---|---|
| 3,149,902 | 9/1964 | Dransfield | 346/105 |
| 3,705,408 | 12/1972 | Krone | 346/139 C |
| 3,730,975 | 5/1973 | Kono | 346/140 R X |
| 3,753,384 | 8/1973 | Anfindsen | 346/141 X |
| 3,864,695 | 2/1975 | Nagashima | 346/140 R X |

*Primary Examiner*—Joseph W. Hartary
*Attorney, Agent, or Firm*—Eidelman, Wolffe & Waldron

[57] ABSTRACT

The present invention relates to a recording mechanism of a picture and writing transmission and recording system using a ball-point-pen which is pressed to a recording surface with some pressure corresponding to electrical signals obtained from informations of letters, marks and pictures so as to put ink on the surface. The present invention is characterized in that a moving coil, which is connected with the said ball-point-pen and is set in magnetic field so as to be controlled with signal current, is freely movable in the axial direction of the ball-point-pen in a certain range so that the pressure of the ball-point-pen which is given to the recording surface and corresponding to a determined signal current is kept essentially uniform.

6 Claims, 10 Drawing Figures

RECORDING MECHANISM USING BALL-POINT-PEN

FIELD OF THE INVENTION

This invention relates to a basic mechanism of a recording part in a picture and writing transmission and recording system using a ball-point-pen.

In the system described hereinafter, informations of letters, marks and pictures obtained by photoelectric conversion and signal production are transmitted to a recording mechanism as electrical signals so as to be recorded on a recording surface.

Namely, the present invention can be utilized as a recording system of duplicators, facsimiles, environmental equipments of computers, and the like.

DESCRIPTION OF THE PRIOR ART

In a recording mechanism of a conventional system for transmitting and recording pictures and writings using a ball-point-pen, a moving coil connected with a ball-point-pen has been united with a diaphragm, and the coil has been driven with signal current flowing through the said moving coil set in magnetic field in such a manner that the ball-point-pen is pressed to a recording surface so as to put ink on the surface.

It is possible to obtain good results in the transmission and recording of pictures and writings of a facsimile or the like by the conventional recording mechanism. However, in order to obtain good results by the conventional mechanism, high level of technique is required in the performance of the diaphragm, the precise interval between the recording surface and the tip-point of the ball-point-pen, and the method of connecting the ball-point-pen with the coil. Moreover, a large coil current is required in order to obtain the necessary recording density. The abovementioned are large defects for the practical use of the conventional system.

FIG. 1 shows a conventional recording mechanism having a diaphragm or a damper. The defects of the conventional recording mechanism will be described with reference to FIG. 1. Reference numeral 21 designates a cylindrical permanent magnet, and 22, 23 and 24 designate yokes. They make a uniform magnetic field at the gap 25. The coil 26 is inserted into the magnetic field gap 25, and a signal current is supplied to the coil from the signal-terminal 27. Moreover, the coil 26 is united with the pen-shaft 28 and the diaphragm or damper 29 through a bobbin. The pen-shaft 28 is supported by the shaft-bearing 31, and the middle part of the shaft-bearing is charged with the greasy material 33 for damping. The ball-point-pen 30 is inserted from the pen-bearing 32, and is pressed and fixed to the pen-shaft 28. The yokes 22, 23 and 24, and the permanent magnet 21 are fixed with the assembling screws 34 of non-magnetic material. This recording part is attached to the fixing plate 35 in such a manner that is is opposite to the recording material 36 placed on the recording base 37. As apparent from the structure shown in FIG. 1, the recording part resembles to the driving part of a moving-coil type speaker. However, the stiffness of the diaphragm or damper must be large, the frequency of the covibration should be sufficiently high, and the damping should be sufficiently performed with the greasy material 33 in order to prevent the excessive vibration. Therefore, the signal current flowing through the coil 26 is decided to be large, and the necessary electric power of the amplifier is nearly several watts. Most defective point of the abovementioned mechanism will be described hereinafter.

The interval Lo between the fixing plate 35 of the mechanism and the surface of the recording material 36 on the recording base 37 is a very important factor for recording. It is assumed that, in case of the scanning of the recording, the recording part is set in such a manner that the ball-point-pen is pressed to the point A of the recording material with a certain pressure with respect to a certain signal level. In case the recording surface has unevenness with respect to the fixing plate 35, when the scanning is forwarded to the point B which is farther than the point A by $\Delta L$, the pressure of the ball-point-pen to the recording surface with respect to the fixed signal level is lowered. Therefore, the recording conditions at the points A and B are apparently different as shown in FIG. 5. In FIG. 5, at the point A, the recording width R is obtained with the fixed pressure of the ball-point-pen. However, at the point B, the pressure is lowered, and accordingly the recording width is smaller than R or nothing is recorded. In order to obtain good recording result by the abovementioned mechanism, very severe regulation is required with regard to the precision of the recording base 37, the precision in the attachment of the scanning mechanism, the thickness of the recording material 36 and its precision, and it causes the rise in the production cost. Moreover, in the case that the ball-point-pen 30 is replaced with new one, the position where the new ball-point-pen is inserted and fixed has to be regulated. It is apparent that the movement of the fixing position generally causes the change in the recording condition.

SUMMARY OF THE INVENTION

The object of the present invention is to provide a recording mechanism of a picture and writing transmission and recording system using a ball-point-pen by which the abovementioned defects are eliminated.

The present invention is characterized in that, in the recording mechanism of the picture and writing transmission and recording system using a ball-point-pen, a coil, which is connected with the ball-point-pen and set in magnetic field so as to be controlled with signal current, is freely movable in the axial direction of the ball-point-pen in a certain range so that the pressure of the ball-point-pen which is given to the recording surface and corresponding to a determined signal current is kept essentially uniform.

Other objects and features of the present invention will be apparent from the detailed description of the invention with reference to the accompanying drawings.

BRIEF DESCRIPTION OF THE DRAWINGS

FIG. 8 (A) is a sectional elevation view;

FIG. 8 (B) is a front elevation view showing only a main part seen from the side of the recording material.

DETAILED DESCRIPTION OF THE INVENTION

Some embodiments of the present invention will be described hereinafter referring to the accompanying drawings.

Figure 1:
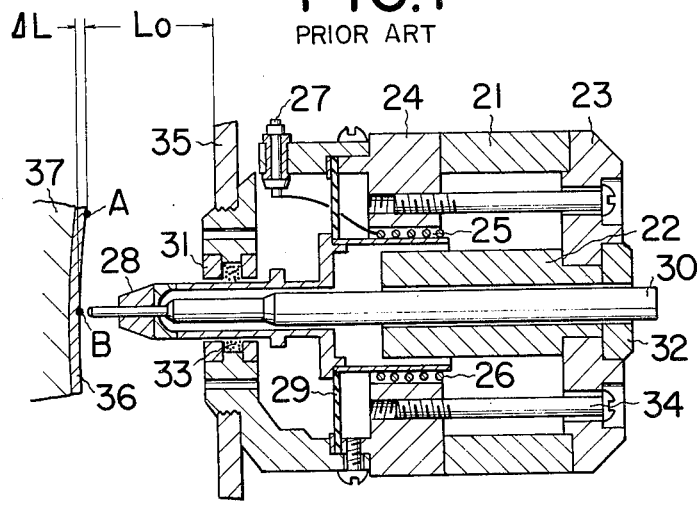
FIG. 1 is a sectional elevation view showing an example of the conventional recording mechanism.
Figure 2:
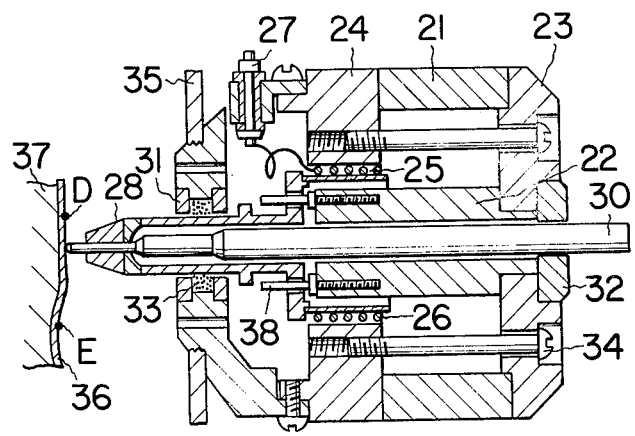
FIG. 2 is a sectional elevation view showing the recording mechanism in the basic embodiment of the present invention.
Figure 6:
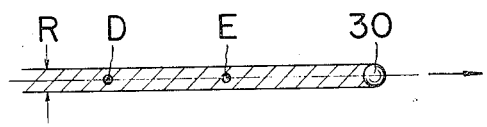
FIG. 6 is an explanatory view showing the good recording condition obtained with the fixed signal current even in case that the surface of the recording material is uneven, in the mechanism of the present invention of FIG. 2.

FIG. 2 is a sectional elevation view showing the basic outline of the present invention. Reference numerals and characters designate the same parts of the conventional recording mechanism of FIG. 1. However, in the mechanism of FIG. 2, the diaphragm or damper 29 is not provided, and the shaft 28 is essentially movable in the axial direction of the ball-point-pen 30 in a certain range. Moreover, the guide-pin 38 is provided in front of the yoke 22, the coil 26 connected with the shaft 28 is retained in the magnetic field gap 25, and the ball-point-pen 30 can be inserted into the shaft 28 by twisting. It is needless to say that the guide-pin 38 is provided in such a manner that the movement of the shaft 28 in the axial direction of the ball-point-pen is not disturbed. In accordance with the mechanism of such a structure, even if the surface of the recording base 37 or the recording material 36 is uneven, the tip-point of the ball-point-pen follows the uneven surface and the pressure given to the surface can be always a certain value with respect to a certain signal level. Namely, in FIG. 2, the pressure of the ball-point-pen given to the convex part D and the concave part E of the recording material is uniform with the fixed signal level, and accordingly the fixed recording width R can be kept as shown in FIG. 6.

Figure 3:
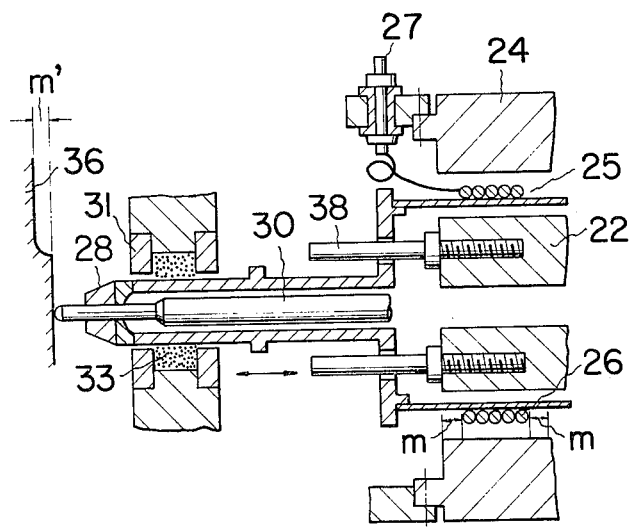
FIG. 3 is a sectional elevation view of the main part of FIG. 2.

This will be described in detail with reference to FIG. 3. FIG. 3 shows the main part of FIG. 2. In FIG. 3, the surface of the recording material has uneven part m'. In case that the uniform magnetic field in the gap 25 fully covers the full length of the coil 26 in the axial direction of the ball-point-pen, and further there are excess parts m in front and in the rear of the coil, if the uneven part m' is smaller than the excess part m, the magnetic flux effective to the coil 26 is not affected by the movement of the ball-point-pen 30 in the length of m', i.e. the movement of the coil 26 in the length of m'. The tip-point of the ball-point-pen 30 applys a fixed pressure to the recording material 36 with a fixed current flowing through the coil 26.

Figure 7:
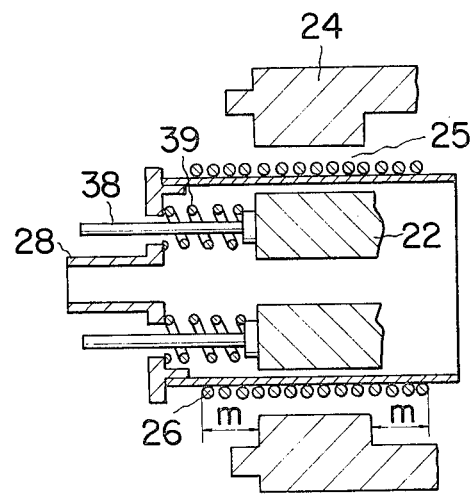
FIG. 7 is a sectional elevation view of the main part showing another example corresponding to FIG. 3.

As shown in FIG. 7, the same thing can be said also in case that the full length of the coil 26 in the axial direction of the ball-point-pen is sufficiently long with regard to the gap 25 of the uniform magnetic flux, and there are excess lengthes m in the axial direction.

Figure 4:
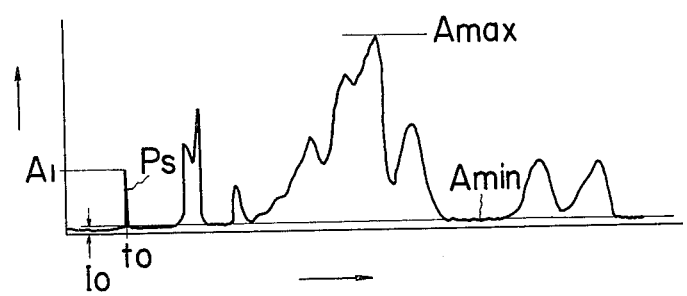
FIG. 4 is a diagram showing an example of the signal current flowing through the coil at the time period of one scanning.
Figure 5:
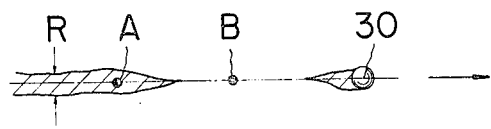
FIG. 5 is an explanatory view showing the bad recording condition obtained with the fixed signal current in case that the surface of the recording material is uneven, in the conventional mechanism of FIG. 1.

The action corresponding to the signal current in the abovementioned embodiment of the present invention will be described hereinafter. FIG. 4 shows an example of the signal current at the time period of one scanning. The signal includes a point A max corresponding to the maximum density necessary for the recording, and a point A min corresponding to the minimum density. Generally, the minimum density is white. Namely, it is desirable that the ball-point-pen does not essentially record on the recording surface with the current corresponding to the point A min. Fortunately, unless the pressure of the ball-point-pen given to the recording surface is over a certain value Po, the ball-point-pen does not transcribe ink in general. Even if ink is transcribed with very small pressure, the density is essentially negligible. Therefore, in the enforcement of the present invention, it is possible to flow a very small bias current Io corresponding to the point A min through the coil 26. If the bias current Io is flowing, the ball-point-pen 30 can easily follow the recording material, and the good recording response can be obtained with respect to the small change and the rapid change of the signal current.

In order to perform the action similar to the bias current Io, it is possible to provide the weak spring-coil 39 which does not essentially affect the recording density, as shown in FIG. 7. The spring-coil 39 pushes the pen-shaft 28 in the axial direction of the ball-point-pen toward the recording surface with very small force, and press-fits the ball-point-pen onto the surface of the recording material so as to make the following time minimum. It is required that the press-fitting of the ball-point-pen to the recording material 36 by the spring-coil 39 at the minimum density is less than 60 gr.

The current A max corresponding to the maximum density is determined by the desirable maximum pressure of the ball-point-pen to the recording material, and is normally selected to be 100 gr. to 200 gr. It is needless to say that the corresponding current value depends on the winding numbers of the coil and the density of the magnetic flux. This explanation will be omitted, for it is not the essence of the present invention.

In accordance with the abovementioned embodiment, the signal current A max to A min shown in FIG. 4 is recorded as the continuous change of the density. If γ-correction is well performed with regard to the signal current, the true recording characteristic is attained. The explanation of the γ-correction will be also omitted, for it is not the essence of the present invention.

In case that the recording material is a paper-sheet and only one end of the paper-sheet is fixed, the ball-point-pen sometimes rebounds at another end of the paper-sheet. In that case, in order to accelerate the following speed of the pen on the paper-sheet, it is effective to provide a setting pulse Ps of a certain short pulse-width and a certain amplitude at the beginning to of the scanning as shown in FIG. 4.

Hereinbefore, the basic principle of the present invention has been described. A small defect of the recording mechanism constructed in accordance with the abovedescribed principle will be described hereinafter. Namely, in this principle, the tip-point of the ball-point-pen always contacts the recording surface except the blanking duration of a picture. In that case, the recording corresponding to the minimum density is not subjected to the substantial obstruction as abovedescribed. However, in case that very good recording is required or the recording corresponding to the minimum density is required even for a recording material the surface of which has very sharp concave and convex parts, the recording method according to the abovedescribed recording mechanism is insufficient. As the result of the experiment, inequality occurred at the minimum density part of the recording surface. This phenomenon is due to the fact that the tip-point of the ball-point-pen is in contact with the recording surface even when the recording of the minimum density is required.

The next embodiment of the present invention is to eliminate even such a small defect. In brief, in case the minimum density is completely white, the tip-point of the ball-point-pen is separated away from the recording surface by a very small distance. The ball-point-pen can follow the uneven parts of the recording surface, and the recording pressure of the ball-point-pen corresponding to the determined signal current can be kept essentially uniform.

Figure 8:
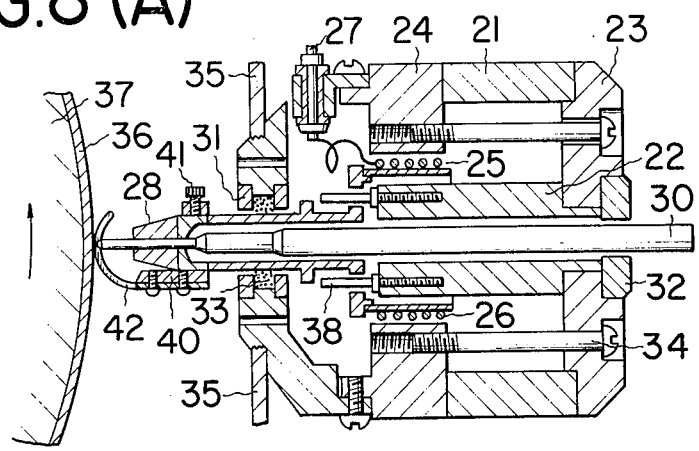
FIGS. 8 (A) and 8 (B) show one embodiment of the present invention.
Figure 8:
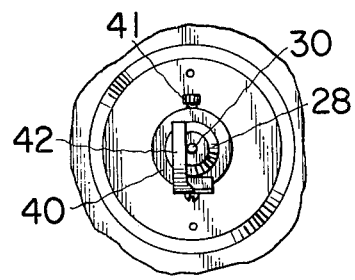
Figure 9:
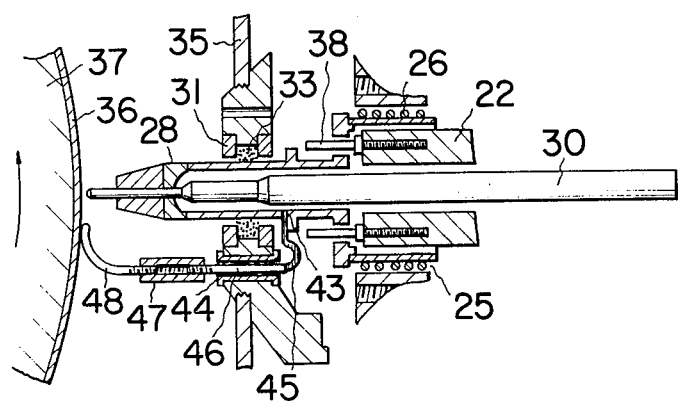
FIG. 9 is a sectional elevation view of a main part showing other embodiment of the present invention.

The present invention will be further described with reference to FIGS. 8 and 9. In FIGS. 8 and 9, reference numerals 28, 30, 36 and 37 respectively designate the pen-shaft, the ball-point-pen, the recording material and the recording base. The structures and the functions thereof are completely the same as those shown in FIG. 2.

Reference numeral 42 designates an elastic strip to contact the recording surface. The elastic strip is made of stainless sheet or steel wire, the thickness of which is for example 0.1 mm., and is fixed to the attaching member 40. The attaching member 40 is provided with the setting screw 41. The strip attaching member 40 is connected and fixed to the pen-shaft 28 with the setting screw 41 in such a manner that when the signal current corresponding to the minimum density is flowing through the coil 26, the elastic strip 42 contacts the recording surface, and the tip-point of the ball-point-pen is away from the recording surface by a very small distance. FIG. 8 (B) shows the condition that the elastic strip 42 made of stainless sheet is fixed to the attaching member 40 and the attaching member 40 is further fixed to the pen-shaft 28 with the setting screw 41. It is the view showing only the main part of FIG. 8 (A) seen from the side of the recording material.

FIG. 9 shows other embodiment of the present invention. In the present embodiment, the contact-rod 48 made of steel is connected to the moving rod 46 with the adjusting joint 47. It is convenient to execute the connection of the contact-rod 48, the adjusting joint 47 and the moving rod 46 wth screws, and it is desirable that after the interval between the contact-rod 48 and the moving rod 46 is adjusted, the screw parts are fixed with a binding agent. The rod 46 is easily movable in the axial direction of the ball-point-pen by the rod-bearing 44. One end of the rod 46 is connected with one end of the elastic strip 45, and another end of the elastic strip 45 is connected with the pen-shaft 28. This connection is executed by making a small hole 43 on the pen-shaft 28 and inserting one end of the elastic strip 45 into the hole 43. The adjustment in the present embodiment is the same as in the embodiment shown in FIG. 8. The adjusting joint 47 is set in such a manner that when the signal current corresponding to the minimum density is flowing through the coil 26, the contact-rod 48 contacts the recording surface, and the tip-point of the ball-point-pen is away from the recording surface by a very small distance. It can be also easily executed without changing the idea of the present invention that a spring is inserted between the moving rod 46 and the adjusting joint 47 in such a manner that the contact-rod 48 presses the recording material in order to improve the following of the contact-rod 48 on the recording surface.

Under the idea similar to the abovedescribed embodiments, other embodiments can be very easily led. If, instead of the connection of the moving rod 46 and the pen-shaft 28 using the elastic strip 45 shown in FIG. 9, electronic or optical device by which the displacement of the moving rod 46 is detected, for example a device in which the position of one end of the moving rod 46 is detected by a luminous diode and a photo-transistor so as to be converted into electrical signals, is used, and the electric signals are used as the current flowing through the coil 26, the effect similar to that in the abovementioned embodiments can be obtained.

As it is clear from the abovedescribed embodiments, the line expansion of the elastic strip 42 of FIG. 8, and the contact-rod 48 and the moving rod 46 of FIG. 9 can be utilized in order to compensate the temperature character of the recording density of the ball-point-pen. Namely, it is possible to expand the interval between the recording surface and the tip-point of the ball-point-pen with the rise of the temperature by suitably selecting the coefficient of the line expansion, so as to compensate the tendency that the density becomes large with the rise of the temperature which is the recording character of a general ball-point-pen.

We claim:

1. A recording mechanism using a ball-point pen, comprising:
 a shaft having a ball-point pen fixed in the center thereof and a movable coil wound around the outer periphery of said shaft;
 a mechanism for supporting said shaft in a freely slidable manner such that said ball-point pen, said shaft and said movable coil are substantially free to move within a certain range in the axial direction of said pen;
 an elastic strip fixed to said shaft, said strip projecting a little distance beyond the writing tip of said pen when said pen is at its free non-recording condition, and said strip contacting a recording paper concurrently with said pen at the recording condition; and
 a gap having a uniform magnetic field in which said movable coil is set such that said coil moves in said axial direction with said shaft and said pen in said magnetic field when a varying electric current passes through said coil.

2. The recording mechanism of claim 1 wherein said freely supporting mechanism comprises a plurality of guide pins projecting in said axial direction beyond the forward end of a yoke and constraining said shaft in said freely slidable manner.

3. The recording mechanism of claim 1 wherein said movable coil is shorter than the length of said gap, said coil being set in said magnetic field leaving a predetermined length of excess magnetic field in front and in the rear of said coil.

4. The recording mechanism of claim 1 wherein said movable coil is longer than the length of said gap and said coil extends beyond the front and rear of said gap and said magnetic field.

5. The recording mechanism of claim 1, wherein said elastic strip has its elasticity at the forward end contacting the recording paper.

6. The recording mechanism of claim 1, wherein said elastic strip has its elasticity at the portion connected to said shaft.

* * * * *